United States Patent [19]
Davenport

[11] Patent Number: 5,093,770
[45] Date of Patent: Mar. 3, 1992

[54] ELECTRICAL ENERGY STORAGE SYSTEM

[75] Inventor: John L. Davenport, Marple, United Kingdom

[73] Assignee: GEC Alsthom Limited, England

[21] Appl. No.: 603,474

[22] Filed: Oct. 25, 1990

[30] Foreign Application Priority Data

Oct. 27, 1989 [GB] United Kingdom ............... 8924238

[51] Int. Cl.$^5$ ................. H02J 15/00; H01H 47/00
[52] U.S. Cl. ........................................ 363/74; 320/1;
323/357; 323/358; 361/71; 361/154
[58] Field of Search ................. 363/74, 76, 125, 126;
323/357, 358; 361/71, 72, 115, 154, 15, 160,
170, 187; 307/132 R, 132 E, 132 EA, 143;
320/1; 335/6, 26, 27, 28

[56] References Cited

U.S. PATENT DOCUMENTS

| | | | |
|---|---|---|---|
| 3,943,435 | 3/1976 | DeJarnette | 323/358 |
| 4,443,828 | 4/1984 | Legrand et al. | 361/115 X |
| 4,553,188 | 11/1985 | Aubrey et al. | 361/115 |
| 4,823,074 | 4/1989 | McLymann | 324/117 R |

FOREIGN PATENT DOCUMENTS 2622368 4/1989 France .
562638 7/1944 United Kingdom .

Primary Examiner—Steven L. Stephan
Assistant Examiner—Emanuel Todd Voeltz
Attorney, Agent, or Firm—Kirschstein, Ottinger, Israel & Schiffmiller

[57] ABSTRACT

A circuit arrangement for providing a store of energy for actuating an electrically operable device, incorporating a reservoir capacitor, comprising a transformer having low resistance windings, the primary winding of which is connectable to an alternating current high voltage supply in series with at least one resistance capacitor, and the secondary winding of which is connected to the reservoir capacitor through a rectifier, the capacitor being connectable to an electrically operable device, with the turns ratio of the transformer such as to produce a secondary current of sufficient magnitude to charge the reservoir capacitor in the time available for successive operations or successive operational sequences of the device.

7 Claims, 1 Drawing Sheet

ELECTRICAL ENERGY STORAGE SYSTEM

BACKGROUND OF THE INVENTION

1. Field of the Invention

This invention relates to circuit arrangements for providing a store of electrical energy for actuating an electrically operable device, more especially for altering the state of a magnetic actuator in order to effect the opening or closing of an associated circuit breaker.

2. Description of Related Art

Such a circuit arrangement may, for example, incorporate a large reservoir capacitor which, when fully charged, stores sufficient energy to permit several close/open operations constituting an auto-reclose cycle of the circuit breaker, ending in the circuit breaker locked out in the open position, in the event of a fault in the line controlled by the circuit breaker to clear by the end of the cycle.

A typical auto-reclose cycle can, for example, take the form o-t-co-t'-co-t"-co or alternatively co-t-co-t'-co-t"-co where
 c = closing operation
 o = opening operation, and
 t, t', t" are increasing time intervals in the range 0.3 to several seconds, which can be set as required. After the cycle has been completed, a relatively long time interval, of the order of minutes, would then be available for re-charging of the reservoir capacitor in readiness for further operations.

Although re-charging of the reservoir from a conventional voltage transformer and rectifier connected to the supply side of the circuit breaker is technically sound, it incurs considerable expense in order to provide the relatively low power required for this purpose.

SUMMARY OF THE INVENTION

Accordingly an object of the invention is to provide a low power charging source from high voltage conductors of a supply line, using components which in total are less expensive than a conventional voltage transformer.

According to the invention a circuit arrangement for providing a store of electrical energy for actuating an electrically operable device, incorporating a reservoir capacitor, comprises a transformer having low resistance windings, the primary winding of which is connectable to an alternating current high voltage supply in series with at least one reactance capacitor, and the secondary winding of which is connected to the reservoir capacitor through a rectifier, the capacitor being connectable to said electrically operable device, with the turns ratio of the transformer such as to produce a secondary current of sufficient magnitude to charge the reservoir capacitor in the time available for successive operations or successive operational sequences of the device.

In the application of the circuit arrangement to the operation of magnetic actuators for effecting close/open operations of an associated circuit breaker, the reservoir capacitor must, of course, be capable of storing sufficient energy to permit the required number of close/open operations in the auto-reclose cycle, and the charging current must be adequate to permit charging of the reservoir capacitor in the time available between successive auto-reclose cycles.

The magnetic actuator may, for example, be of the construction described in co-pending U.K. Patent Application No. 8918416.2 (Ser. No. 2223357A) corresponding to pending U.S. patent application Ser. No. 07/469,404 said actuator comprising a housing defined by two interlinked magnetic yokes, outer limbs of which constitute magnetic pole pieces, and inner limbs of which are mechanically connected; an armature axially receiprocable within the housing between the pole pieces and through the inner limbs on an axis passing through both limbs of both yokes, between two stable positions at each of which it forms a magnetic circuit with a respective magnetic pole piece and breaks the corresponding magnetic circuit with the other magnetic pole piece; an axially polarised magnet carried by the armature for generating the magnetic flux in the said magnetic circuits to hold the armature at one or other of the stable positions; and means for generating a transient magnetic field, in response to an actuation signal, simultaneously to reduce the flux in the said magnetic circuit without reducing significantly the flux within the permanent magnet, thereby to destabilise the armature without promoting demagnetisation of the permanent magnet, and to increase the flux between the armature and the other pole piece to attract the armature to that other pole piece.

Where the primary winding of the transformer, which can take the form of a current transformer, is connected between two high voltage conductors, the winding is preferably connected to each of the conductors through a respective reactance capacitor.

However where the primary winding is connected between a high voltage conductor and an earth conductor, the primary winding can be connected directly to the earth conductor, a single reactance capacitor being connected between the primary winding and the high voltage conductor.

The voltage to which the reservoir capacitor is charged is conveniently determined by a Zener diode connected in parallel with the reservoir capacitor, although other means of achieving this may alternatively be employed as will subsequently be described.

BRIEF DESCRIPTION OF THE DRAWING

Two circuit arrangements in accordance with the invention, for use in charging a capacitor capable of storing electrical energy for the operation of a magnetic actuator designed to produce a number of close/open operations of an associated circuit breaker, for example as described in co-pending U.K. Patent Application No. 8918416.2, will now be described by way of example with reference to the accompanying drawings, in which.

DETAILED DESCRIPTION OF THE PREFERRED EMBODIMENTS

Figure 1:
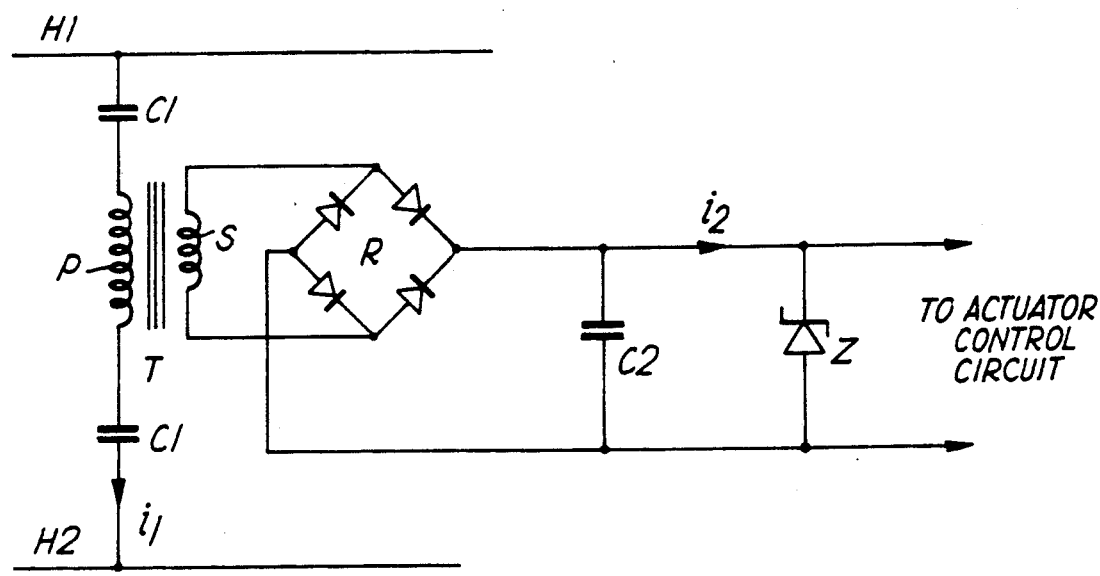
FIG. 1 is an electrical schematic of one embodiment of this invention.

In the circuit arrangement of FIG. 1 the primary winding P of a current transformer T is connected between a pair of high voltage alternating current supply conductors H1, H2 a capacitor C1 being connected between each end of the primary winding and the respective supply conductor H1, H2. The primary current $i_1$ of the transformer is defined almost entirely by the reactance of the two series capacitors C1.

The secondary winding S of the transformer T is connected to a reservoir capacitor C2 through a full wave rectifier R, and the reservoir capacitor C2 is connected, in turn, to the magnetic actuator control circuit. The construction of the magnetic actuator and the control arrangements therefor are not relevant to the present invention, but may be as described in U.K. Patent Application No. 8918416.2.

A current transformer suitable for such a purpose has a primary winding P of 5000 turns, a secondary winding S of 1000 turns, and a laminated iron core with a cross-sectional area of 900 mm$^2$.

A Zener diode Z is connected across the reservoir capacitor C2 to determine the voltage to which the capacitor is finally charged, the Zener diode then conducting the secondary current $i_2$ from the rectifier R. The turns ratio of the transformer T is chosen to produce a secondary current $i_2$ which is of sufficient magnitude to charge the reservoir capacitor C2 in the time available between successive auto-reclose cycles of the circuit breaker. The reservoir capacitor conveniently has a nominal capacity 10,000 $\mu$F, and is arranged to be charged to a voltage of 380 V determined by the Zener diode Z, to give an energy storage of 700 joules for an auto-reclose cycle as above described to be completed without recharging being required.

The circuit as above described was tested for line voltages of 12 kV, 15 kV and 27 kV, the transformer design remaining the same in each case. The capacitors C1 were each 0.024 $\mu$F for the 12 kV line voltage and proportionally less for the 15 kV and 27 kV line voltages to give a primary current $i_1 = 0.045$A. Part of this primary current is required for magnetising the transformer core and the remainder, increased by the 5:1 turns ratio, is converted to a rectified secondary current $i_2 = 0.17$A. The time to charge the capacitor C2 from zero to 380 V was found to be 35 seconds, which is well within the time required for starting a further auto-reclose cycle.

Figure 2:
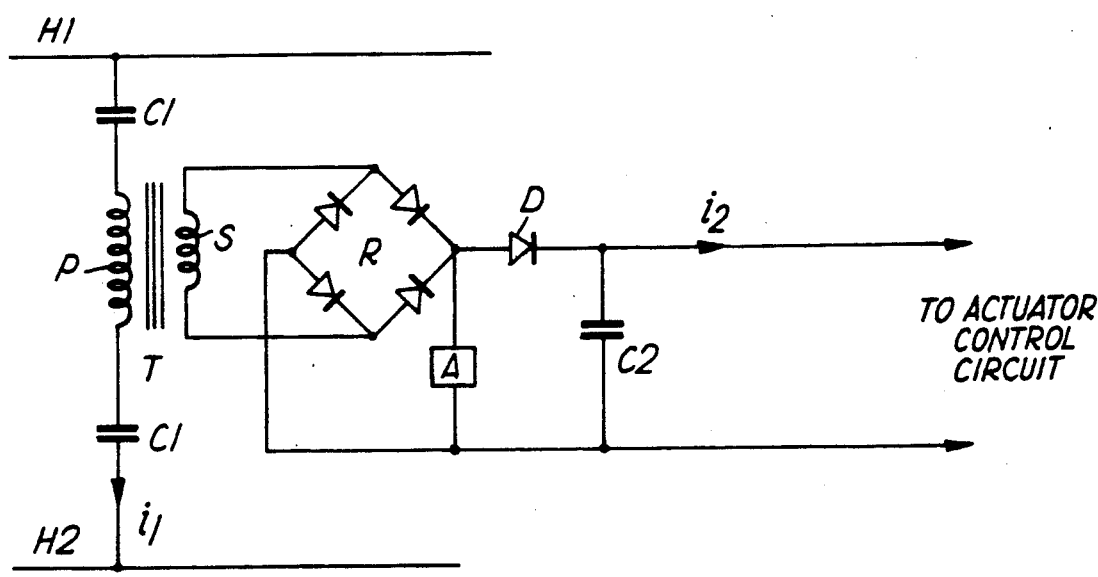
FIG. 2 is an electric schematic of another embodiment of this invention.

The circuit arrangement illustrated in FIG. 2 is similar to that of FIG. 1 except that in place of the Zener diode Z electronic means, as shown by A, is built into the circuit to short circuit the rectified supply at the output of the rectifier R when the reservoir capacitor C2 is fully charged, and to re-establish the supply when the voltage has decreased by a certain amount, either by leakage or on operation of the actuator. Where such an electronic means is employed the reservoir capacitor will normally voltage cycle between an upper and a lower limit, a diode, as at D, being connected between the reservoir capacitor C2 and the electronic means as shown to prevent discharge of the capacitor into the short circuit when applied.

In each of the circuits illustrated, the primary winding P of the charging circuit transformer T may alternatively be connected between one high voltage line and earth, in which case a single capacitor C1 only, with a suitably changed capacitance value, need be connected between the primary winding and the high voltage line, the other end of the primary winding being connected directly to an earth conductor.

I claim:

1. A circuit arrangement for providing a store of energy for actuating an electrically operable device, incorporating a reservoir capacitor, comprising a transformer having low resistance primary and secondary windings, the primary winding of the transformer being connected in series with at least one reactance capacitor between a high voltage alternating current supply conductor and another conductor to provide, in use, a voltage difference across the primary winding, the secondary winding of the transformer being connected to the reservoir capacitor through a rectifier to effect charging of the reservoir capacitor, and the reservoir capacitor being connected to said electrically operable device via a control circuit therefore, the transformer having a turns ratio such as to produce a secondary current of sufficient magnitude to charge the reservoir capacitor in the time available for successive operations or successive operational sequences of the device.

2. A circuit arrangement according to claim 1, wherein the device is a magnetic actuator for effecting automatic close/open operations of a circuit breaker, wherein the reservoir capacitor is capable of storing sufficient energy to permit a predetermined number of the close/open operations in an auto-reclose cycle, the charging secondary current being adequate to permit charging of the reservoir capacitor in the time available between successive auto-reclose cycles.

3. A circuit arrangement according to claim 1 wherein the transformer is a current transformer.

4. A circuit arrangement according to claim 1 wherein the other conductor is a high voltage conductor, and wherein the primary winding of the transformer is connected between the two high voltage conductors, each end of the primary winding being connected to a respective high voltage conductor through a respective reactance capacitor.

5. A circuit arrangement according to claim 1 wherein the other conductor is an earth conductor, and wherein the primary winding is connected between a high voltage conductor and the earth conductor, one end of the primary winding being connected to the high voltage conductor through said at least one reactance capacitor, and an opposite end of the primary winding being connected directly to the earth conductor.

6. A circuit arrangement according to claim 1 wherein a Zener diode is connected in parallel with the reservoir capacitor.

7. A circuit arrangement according to claim 1 wherein the rectifier generates an output rectified supply voltage, and including electronic means operable to short circuit the output rectified supply voltage of the rectifier when the reservoir capacitor is fully charged and to re-establish the supply voltage when the latter has decreased by a predetermined amount, and a diode operatively connected between the reservoir capacitor and the electronic means in a sense such as to prevent discharge of the reservoir capacitor into the electronic means during the short circuit.

* * * * *